Aug. 28, 1934.  C. BENCE  1,972,004
BRAKE MECHANISM, PARTICULARLY FOR ROAD VEHICLES
Filed April 3, 1934
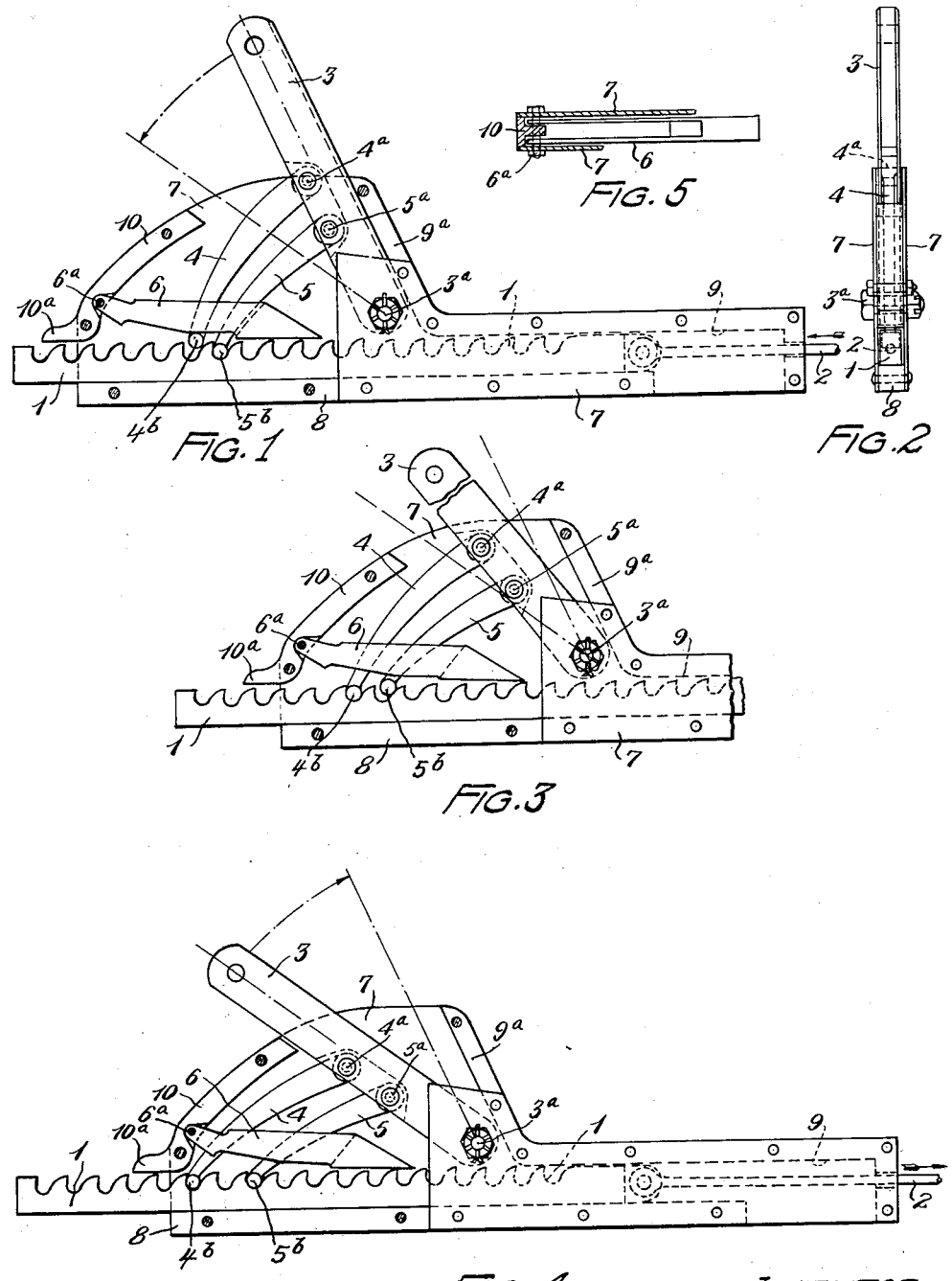
INVENTOR:
CHARLES BENCE
Kwis Hudson & Kent
ATTORNEYS Patented Aug. 28, 1934

1,972,004

UNITED STATES PATENT OFFICE 1,972,004

BRAKE MECHANISM, PARTICULARLY FOR ROAD VEHICLES

Charles Bence, London, England

Application April 3, 1934, Serial No. 718,818
In Great Britain July 6, 1932

2 Claims. (Cl. 188—196)

This invention relates to improvements in or relating to brake mechanism, particularly for road vehicles, and especially to that class in which the pull rod, by means of which the brake blocks are actuated, is provided with pawls and ratchets mechanism for taking up the slack caused by wear of the working parts, and has for its object to construct such class of mechanism in an improved and simplified manner, and whereby during the first part of the movement of the actuating lever, the rack is moved quickly, and during the second part the pressure is applied to the brake.

According to this invention, the brake mechanism comprises a toothed member connected to the brake proper, a pivoted operating lever, and two pawls of different lengths pivoted on the lever at a distance apart and engaging in the teeth of the toothed member and operating in a manner as will be hereinafter described.

The brake proper may be of any approved form involving for instance, an expanding or contracting shoe or band.

The invention will be clearly understood from the following description aided by the annexed drawing in which one example is shown of carrying the invention into effect and in which:—

Figure 1 is a side view with a portion of one side cover plate removed of the brake operating mechanism showing the mechanism with the brake in the "off" position.

Figure 2 is an end view of Figure 1.

Figure 3 is a similar view to Figure 1, but showing the brake mechanism in the operated or "on" position.

Figure 4 is a similar view to Figure 3 but showing the brake mechanism in the operated and adjustment position, and, Figure 5 is a plan view of the yoke and showing its connection to the frame.

In the example shown on the accompanying drawing, the mechanism comprises a slidable toothed rack 1 to one end of which is secured a rod 2 or cable connected with the brake. Above the rack 1 is a brake lever 3 pivoted at $3^a$ and carrying two pawls 4, 5, pivotally mounted on the lever 3 at a little distance apart as at $4^a$, $5^a$. Each pawl 4, 5 is formed with a tooth $4^b$, $5^b$ which projects on both sides of the pawl, and over the pawls 4, 5, is a yoke 6, pivoted at $6^a$ acting as hereinafter described.

The above parts are conveniently mounted in a frame or support consisting of side plates 7 and distancing pieces 8, 9, 10, the piece 8 acting as a base on which the rack 1 can slide, strip 9 being bent upwards at $9^a$ to act as a back stop for the brake lever 3, whilst the piece 10 acts as a front stop for the lever 3 and can be formed with a nose $10^a$ acting as an upper guide for the rack 1, a gap being left between the pieces 9 and 10 in which the brake lever works.

In Figure 1 the mechanism is shown in the non-operative position, that is with the brake off, the rear pawl 5 being engaged between two teeth of the rack 1 and the front pawl 4 resting on the back edge of the tooth in front of the rear pawl 5.

Now to apply the brake, the lever 3 is pressed forward in the usual manner by the foot or through a hand lever when the pawl 5 will be operated to push the rack 1 forward for a certain distance, when the front pawl 4 engages with the tooth to continue the movement of the rack 1 as the lever 3 is further operated (approximately 10°) the rear pawl 5 riding up the back edge of the tooth to about the position shown in Figure 3 when, if the brake is in proper condition, the brake will be fully applied through the pull on the rod 2 or cable, and the lever 3 cannot be moved further forward.

To release the brake, the lever 3 is allowed to return to its in-operative position and the rack 1 will at the same time return backwards under action of the brake springs with the pawls 4 and 5 remaining in between the same teeth.

Now should the brake require tightening up or adjusting due to wear, the lever 3 can be moved further forward to its fullest extent as in Figure 4, during this continued movement the rear pawl 5 will ride up the back edge of the tooth and drop between this tooth and the next rearward tooth, so that on allowing the lever 3 to move back, the rack 1 will also move back, the rear pawl 5 remaining in engagement with the tooth in its fresh position, and the front pawl 4 will ride up and over the tooth to be positioned in front of the tooth in advance of the rear pawl 5. So that in the in-operative position the rack will be the thickness of one tooth in advance of its original position and the brake adjusted accordingly.

When either of the pawls 4 or 5 are lifted to ride over a tooth in the rack 1, the projecting teeth $4^b$ or $5^b$ will engage under the yoke 6 and lift same, and the weight of the yoke will ensure that the pawls 4, 5 are returned to engagement with the teeth of the rack.

By this construction and arrangement of the pawls which are of different lengths, the first part of the forward movement of the lever 3 causes the rack 1 to move a greater distance than the second part of the forward movement, so that during the first part, the rack is moved quickly and during the second part the pressure is applied to the brake.

The brake proper may be of any form involving for instance an expanding or contracting shoe or band.

The lever 3 may be formed as a pedal lever or may be connected to a pedal lever, hand lever or other mechanism for operating same.

Although a preferred embodiment of the invention has been illustrated and described herein, it should be understood that the invention is susceptible of various modifications and adaptations within the scope of the appended claims.

What I do claim as my invention and desire to obtain by Letters Patent is:—

1. In a brake operating mechanism of the character described, a fixed support, an operating lever pivoted to said support, a movable toothed member mounted in said support below the pivot of said operating lever and adapted to be connected to the brake mechanism, and two pawls of different length pivoted on said lever at a distance apart and above the pivot of the lever, said pawls being so proportioned that one or both may be brought into engagement with the teeth of said member depending upon the position of said lever.

2. In a brake operating mechanism of the character described, a fixed support, an operating lever pivoted to said support, a movable toothed member mounted in said support below the pivot of said operating lever and adapted to be connected to the brake mechanism, and two pawls of different length pivoted on said lever at a distance apart and above the pivot of the lever, said pawls being so proportioned and having their points of connection to said lever so spaced that movement of the lever in a direction to cause brake actuating movement of said member causes the shorter of said pawls to engage the teeth of said member before the longer pawl engages the same.

CHARLES BENCE.